United States Patent
Jungclaus

(10) Patent No.: US 9,715,794 B2
(45) Date of Patent: Jul. 25, 2017

(54) POS SYSTEM AND METHOD FOR OPERATING A POS SYSTEM

(71) Applicant: Wincor Nixdorf International GmbH, Paderborn (DE)

(72) Inventor: Kai Jungclaus, Langenfeld (DE)

(73) Assignee: WINCOR NIXDORF INTERNATIONAL GMBH, Paderborn (DE)

( * ) Notice: Subject to any disclaimer, the term of this patent is extended or adjusted under 35 U.S.C. 154(b) by 490 days.

(21) Appl. No.: 14/311,100

(22) Filed: Jun. 20, 2014

(65) Prior Publication Data

US 2014/0379501 A1    Dec. 25, 2014

(30) Foreign Application Priority Data

Jun. 21, 2013 (EP) .................... 13173301
Jun. 24, 2013 (EP) .................... 13173379

(51) Int. Cl.
| | |
|---|---|
| *G07G 1/12* | (2006.01) |
| *G07G 1/00* | (2006.01) |
| *G07G 3/00* | (2006.01) |
| *G06Q 20/20* | (2012.01) |

(52) U.S. Cl.
CPC ............ *G07G 1/12* (2013.01); *G06Q 20/206* (2013.01); *G07G 1/0027* (2013.01); *G07G 3/00* (2013.01); *G07G 3/003* (2013.01)

(58) Field of Classification Search
None
See application file for complete search history.

(56) References Cited

U.S. PATENT DOCUMENTS

| | | |
|---|---|---|
| 4,630,200 A | 12/1986 | Ohmae et al. |
| 2009/0299866 A1 | 12/2009 | Chien et al. |
| 2014/0088760 A1* | 3/2014 | Truong ............... G07G 1/0009 700/244 |

FOREIGN PATENT DOCUMENTS

| | | |
|---|---|---|
| DE | 34 07 674 A1 | 9/1984 |
| DE | 3407674 A1 | 9/1984 |
| JP | S57-100556 A | 6/1982 |
| JP | H09-319963 A | 12/1997 |
| JP | H10-143761 A | 5/1998 |
| JP | 2001-126143 A | 5/2001 |

\* cited by examiner

*Primary Examiner* — Ryan Zeender
*Assistant Examiner* — Denisse Ortiz Roman
(74) *Attorney, Agent, or Firm* — Maschoff Brennan

(57) ABSTRACT

A POS system comprises a checkout means for carrying out a payment operation, a cash drawer which includes a storage compartment for storing money, wherein in an open condition of the cash drawer the storage compartment is open for an access and in a closed condition of the cash drawer the storage compartment is closed, a control means for controlling the cash drawer, wherein the control means is formed to generate a control signal for opening the cash drawer, and a sensor means for generating an opening signal which indicates whether the cash drawer is in its open condition. The control means is formed to evaluate whether or not an opening signal is preceded by a control signal with a predetermined time interval, in order to detect a manipulation process during opening and/or closing the cash drawer on the basis of the evaluation.

11 Claims, 2 Drawing Sheets

POS SYSTEM AND METHOD FOR OPERATING A POS SYSTEM

CROSS-REFERENCE TO RELATED APPLICATIONS

This application claims priority to European Patent Application No. 13 173 301.6 filed on Jun. 21, 2013 and to European Patent Application No. 13 173 379.2 filed on Jun. 24, 2013 the entirety of which is incorporated by reference herein.

BACKGROUND

This invention relates to a POS system and to a method for operating a POS system.

Such a POS system comprises a checkout means for carrying out a payment operation and a cash drawer with a storage compartment for storing money. In an open condition of the cash drawer, the storage compartment is open, so that money can be put into the storage compartment or can be taken from the storage compartment. In a closed condition of the cash drawer, the storage compartment is closed, so that an access to money in the storage compartment is not possible. There is provided a control means for controlling the cash drawer, in that in particular in the event of predetermined conditions the control means generates a control signal for opening the cash drawer. By means of a sensor means it can then be detected whether the cash drawer is open, wherein the sensor means is formed to generate an opening signal which indicates whether the cash drawer is in its open condition.

In a POS system in the form of an electronic cash register, which is known from DE 34 07 674 C2, there is provided a control means in the form of a central processing unit (CPU) which outputs a command to a drive for automatically opening a cash drawer. The control means is formed to initiate an opening operation, when after the registration of goods a payment operation is to be made, during which an operator for example takes cash from the cash drawer and gives the same to a customer. The cash drawer subsequently is manually closed by the operator.

In a conventional POS system, a payment operation generally is made such that an operator registers goods and by means of a suitable reader for example reads in bar codes applied to goods or manually enters goods identifiers into an input device of the POS system. After registration of the goods, the control means generates a control signal for opening the cash drawer, which thereupon is opened automatically, so that the operator can put money into the storage compartment of the cash drawer or take money from the storage compartment. After the payment operation, the cash drawer is manually closed by the operator, so that a further payment operation can be initiated.

In conventional POS systems it is detected by means of a sensor means whether the cash drawer also has correctly been closed again after carrying out a payment operation. For this purpose, the sensor means for example can generate an opening signal in the form of an increased sensor signal level, which is present as long as the cash drawer is open. When the opening signal decreases, it can be inferred therefrom that the cash drawer has been closed.

In such POS systems a manipulation eventually is possible in that a foreign object is brought in contact with the sensor means formed for example as microswitch or microcontact and thereby a closed cash drawer is feigned, so that the opening signal of the sensor means decreases. Although the sensor signal hence indicates a closed cash drawer, the cash drawer in reality still is open, without this being detected by the POS system. With open cash drawer, a manipulator then can access to money present in the cash drawer.

SUMMARY

It is an object of the present invention to provide a POS system and a method for operating a POS system, which in a simple, inexpensive way provide for detecting a manipulation process during opening and/or closing a cash drawer.

According to an exemplary embodiment the invention, the control means is formed to evaluate whether or not a control signal has preceded an opening signal with a predetermined time interval, in order to detect a manipulation process during opening and/or closing the cash drawer on the bases of the evaluation.

The present invention assumes that opening of the cash drawer usually is effected within a predetermined time after a control signal of the control means, with which control signal the control means actuates the cash drawer for opening the storage compartment. By means of the control signal a drive of the cash drawer for example is actuated for extending a drawer which contains the storage compartment, or for opening a flap which covers the storage compartment, wherein the drive for example can be an electromotive drive or a mechanical spring drive. When the control means emits a control signal to the cash drawer, the cash drawer typically is opened within a predetermined time after actuation by the control signal, so that the opening signal is present within this predetermined time.

Conversely, it hence follows that an opening signal which is detected too early or too late after a control signal or completely independent of a control signal can indicate a manipulation process, in which the cash drawer is opened or kept open with a possibly criminal intent. By means of an evaluation as to whether a control signal has preceded an opening signal with a predetermined time interval it can correspondingly be detected whether a manipulation possibly does exist.

The control signal generally has the form of a control pulse which is emitted by the control means, so as to effect the opening of the cash drawer. The opening signal corresponds to a signal which is generated by the sensor means with open cash drawer and for example is an increased signal level of a sensor signal generated by the sensor means. When the opening signal is present, this indicates the open condition of the cash drawer. When the signal level of the sensor signal decreases and the opening signal accordingly no longer exists, this indicates a closed cash drawer (or a manipulated sensor means).

A predetermined time interval in particular is understood to be a reference time (+/−a tolerance), by which the opening signal typically follows a control signal. When the time interval between the control signal and the beginning of the opening signal deviates from a reference time interval or when an opening signal occurs independent of a control signal, this indicates a manipulation process.

The control means can correspondingly be formed to detect a time interval between a generated control signal and an opening signal generated by the sensor means and to compare the same with a predetermined reference time interval for detecting a manipulation process. When the detected time interval lies outside a tolerance range around this reference time interval, this can indicate a manipulation process which can be displayed correspondingly. The opening signal here follows after the control signal. However, when it occurs too early or too late after a control signal and inadmissibly deviates from the reference time interval (which indicates the time interval typically required for opening the cash drawer), this is evaluated as manipulation process and displayed correspondingly.

The control means preferably is formed to measure the time interval between a rising edge of the control signal and a rising edge of the opening signal. Due to the fact that with reference to the rising edges of the control signal and the opening signal the time distance between the control signal and the opening signal is determined, the measurement of the time distance is effected between defined points in time.

The control means also can be formed to indicate a manipulation process when no control signal has immediately preceded an opening signal.

The evaluation of the time distance between a control signal and an opening signal provides for detecting a possible manipulation process due to the fact that an operator who for example has approached a foreign object to the sensor means, in order to actuate for example a microswitch or microcontact and thereby feign a closed cash drawer, will perform the removal of this foreign object independent of a control signal or at least by deviating from the reference time interval after the control signal. When a user has manipulated the sensor means and again eliminates a state of manipulation, this will produce an opening signal which is emitted independent of a control signal or with a time deviating from the reference time interval after a control signal, so that by checking whether or not a control signal has preceded the opening signal with a predetermined time distance a manipulation process possibly can be detected.

In this connection, the control means can be formed to be self-learning. In particular, it can be provided that the control means adapts the reference time interval and/or a tolerance range around the reference time interval, when it detects that for example the time which lies between the control signal and the opening signal on opening of the cash drawer changes e.g. due to age-related alterations, for example due to wear or the like. When it is detected that on proper opening of the cash drawer, initiated by a control signal, more time is required for opening the cash drawer or the time until opening of the cash drawer after provision of the control signal changes in general, the reference time interval or also the admissible tolerance around the reference time interval can be adapted correspondingly, so that such e.g. age-related alterations can be taken into account. The control means can consider such temporal changes over a period, for example over a predetermined number of opening operations, in order to adapt the reference time interval or the tolerance range, when a temporal change in the opening time is detected as recurrent and hence as system-immanent.

The detection of a possible manipulation process can be effected in the described way by using means conventionally present anyway in a POS system, in particular by using a sensor means and a control means. The manipulation detection hence can be realized easily and at low cost and provides for a reliable detection of a manipulation process.

The cash drawer preferably can be removed from the checkout means, and together with the storage compartment arranged therein can thus be inserted in a modular way for example into a receiving slot of the checkout means and also can again be removed from the same. To each cashier one cash drawer for example can be associated, which he or she will remove after use at a checkout means and for example can store in a safe.

The cash drawer preferably is connected with the checkout means via an electric data line. Via the electric data line the control means for example can transmit a control signal to the cash drawer and also query the opening signal of the sensor means arranged at the cash drawer. The electric data line for example can be formed by a multicore data line, wherein the cash drawer for example can electrically be connected to the checkout means by a plug connection, for example by using an RJ11 or RJ12 connector.

When a manipulation process has been detected, the control means for example can log the manipulation process, wherein by means of POS software a person logged in at the checkout means possibly can be associated to the manipulation process.

The control means also can be formed to trigger a (silent or loud) alarm by sounding an acoustic alarm signal or by alerting a suitable instance, for example security personnel inside a retail shop or a security service outside a retail shop.

The control means also can be formed to actuate an alarm system for generating an alarm on detection of a manipulation process. For this purpose, the control means for example cooperates with an alarm system inside a retail shop, which can emit an acoustic alarm signal or alert security personnel inside or outside a retail shop via a suitable telecommunications connection.

The control means in addition can be formed to cooperate with a monitoring means, in order to activate the monitoring means for monitoring the POS system upon detection of a manipulation process. The monitoring means, which for example can be formed by one or more cameras inside a retail shop, thus can record the POS system and operators possibly working at the same, in order to possibly capture a manipulation process in pictures.

The object also is solved by a method for operating a POS system which includes a checkout means for carrying out a payment operation and a cash drawer with a storage compartment for storing money. In an open condition of the cash drawer, the storage compartment is open for an access. In a closed condition of the cash drawer, on the other hand, the storage compartment is closed, so that an access to money inside the storage compartment is not possible. A control means generates a control signal for opening the cash drawer, and a sensor means generates an opening signal which indicates whether the cash drawer is in its open condition. It is provided that the control means evaluates whether or not a control signal has preceded an opening signal with a predetermined time distance, in order to detect a manipulation process on opening and/or closing of the cash drawer with reference to the evaluation.

The advantages and advantageous aspects described above for the POS system analogously are also applicable to the method, so that reference is made to the above explanations.

BRIEF DESCRIPTION OF THE DRAWINGS

The idea underlying the invention will be explained in detail below with reference to the exemplary embodiments illustrated in the Figures.

DETAILED DESCRIPTION

Figure 1:
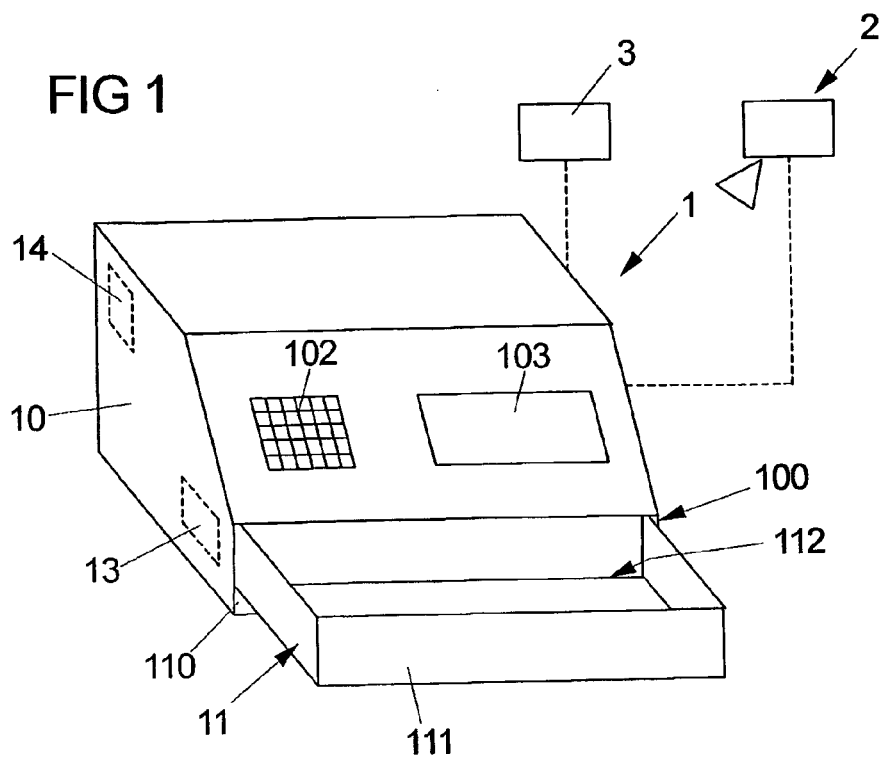
FIG. 1 shows a schematic view of a POS system with a checkout means and a cash drawer.

FIG. 1 shows a schematic view of a POS system 1 which includes a checkout means 10 and a cash drawer 11 arranged at the checkout means 10, with an adjustable drawer 111 and a storage compartment 112 arranged therein for storing cash.

The checkout means 10 for example includes a registering means 101 (schematically shown in FIG. 2) for scanning bar codes of goods, an input means 102 for typing a goods identifier, and a display means 103 in the form of a screen for displaying goods-related information, an amount to be paid, or the like.

The checkout means 10 includes a control means 14 which is designed for controlling a payment operation and also for controlling the cash drawer 11, in particular for automatically opening the drawer 111 of the cash drawer 11.

Furthermore, a sensor means 13 is provided at the cash drawer 11, which for example is formed as microswitch or microcontact and serves to detect whether the drawer 111 of the cash drawer 11 is in an open condition, in which an access to the storage compartment 112 present in the drawer 11 is possible, or in a closed condition, in which the drawer 111 is retracted into a housing 110 of the cash drawer 11.

Figure 2:
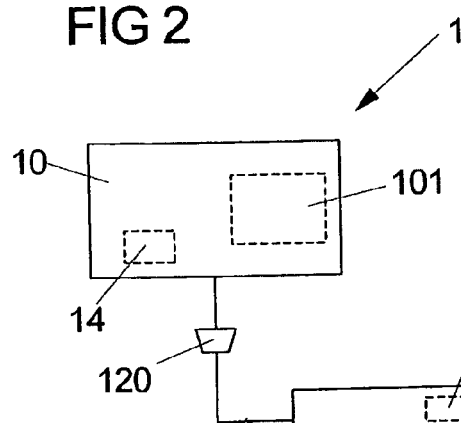
FIG. 2 shows a schematic block view of the POS system.

The cash drawer 11 preferably is designed as modular construction unit and with its housing 110 is releasably inserted into a receiving slot 100 of the checkout means 10. As is schematically shown in FIG. 2, the cash drawer 11 is connected with the checkout means 10 via an electronic data line 12 and a plug connection 120 for example by using an RJ11 or RJ12 connector and thus is connected with the checkout means 10 for an electric communication.

Figure 3:
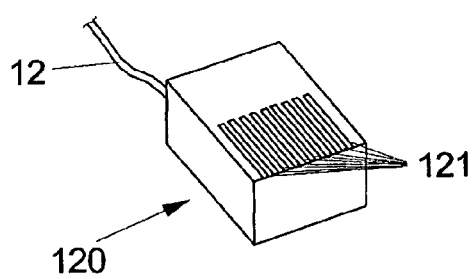
FIG. 3 shows a view of a connector of an electric data line for connecting the cash drawer with the checkout means.

FIG. 3 schematically shows a connector of the plug connection 120. In the illustrated example the connector includes six pins 121, via which a supply voltage is transmitted to the cash drawer 11, control signals of the control means 14 are forwarded to the cash drawer 11, and sensor signals of the sensor means 13 can be queried.

A usual payment operation by means of a POS system 1 of the type shown in FIGS. 1 and 2 for example proceeds as follows.

First of all, bar codes of a number of goods are read in by means of the registering means 1 and the goods thereby are registered. Alternatively or in addition, goods identifiers also can be entered via the input means 102. The checkout means 10 stores the registered goods, adds the individual amounts associated to the goods to obtain a total amount, and possibly outputs goods-related information as well as a total amount via the display means 103.

When a payment operation is to be terminated and the payment of the registered goods is to be made, this can be initiated for example by means of a suitable input via the input means 102, whereupon the checkout means 10 outputs the final amount via the display means 103 and via the control means 14 generates a control signal in the form of a control pulse which is transmitted to the cash drawer 11 and effects an automatic opening of the drawer 111 of the cash drawer 11. With open drawer 111, cash can then be put into the storage compartment 112 of the cash drawer 11 and change can be given to a customer.

After payment has been made, an operator manually closes the drawer 111, so that a next payment operation can be started, during which goods again are read in and registered.

Figure 4:
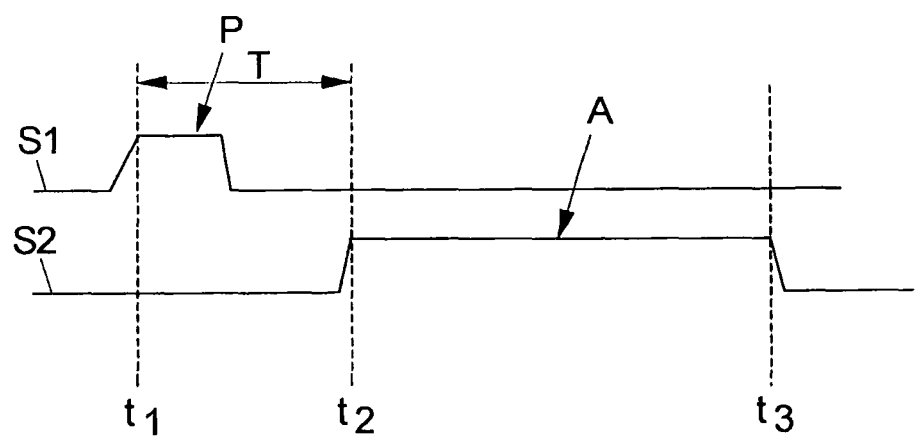
FIG. 4 shows a temporal representation of signals of a control means and a sensor means.

The automatic opening of the drawer 111 is effected by a control signal of the control means 14. Such control signal P is schematically shown in FIG. 4 together with an opening signal A of the sensor means 13. Reference numeral S1 here designates a signal output by the control means 14, while reference numeral S2 indicates a sensor signal emitted by the sensor means 13. The control signal P corresponds to a signal level of the signal S1 of the control means 14 increased in a pulse-like manner, whereas the opening signal A corresponds to an increased signal level of the signal S2 of the sensor means 13. By means of the control signal P the automatic opening operation of the drawer 111 is initiated. When the drawer 111 is open, the sensor means 13 outputs an increased signal level and thus generates the sensor signal A.

The control means 14 generates the control signal P at a time t1 (reference is made to the rising edge of the control signal P). Within a time interval T after the control signal P, which should effect automatic opening of the drawer 111, the drawer 111 is opened in the case of a proper opening operation, so that from the time t2 (corresponding to the rising edge of the opening signal A) the opening signal A is applied. At the time t3 the drawer 111 is closed again, so that the signal level of the signal S2 of the sensor means 13 decreases and thus no more opening signal A is emitted.

In the case of a proper opening operation, the time interval T approximately will correspond to a reference time interval T0 (see FIG. 5), so that with reference to a comparison of the time interval T with the predetermined reference time interval T0 it can be detected whether or not an opening operation is carried out properly.

Figure 5:
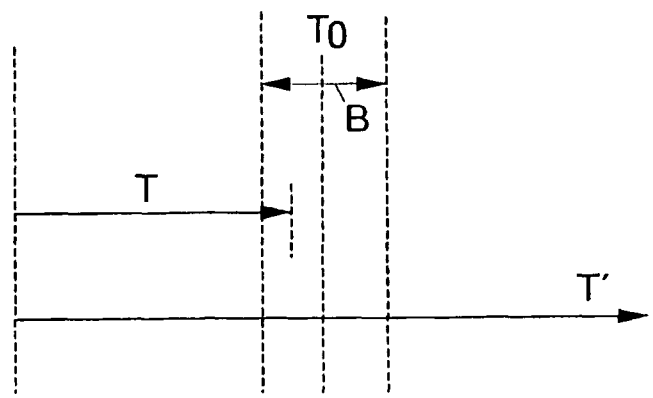
FIG. 5 shows a graphical representation of a time interval between a control signal of the control means and an opening signal of the sensor means in relation to a reference time interval.

When the time interval T, as shown in FIG. 5, lies within a tolerance range B around the reference time interval T0, it can be assumed that the opening operation of the drawer 111 has been effected properly.

When a measured time interval T', as is likewise shown in FIG. 5, however distinctly deviates from the reference time interval T0 and in particular lies outside the tolerance range B around the reference time interval T0, this can indicate that the sensor means 13 has been manipulated, in order to feign for example closing of the drawer 111 after a payment operation. This can have been effected for example by an operator approaching a foreign object for example to a microswitch or microcontact of the sensor means 13 and thus having actuated the same such that the sensor means 13 has emitted no opening signal A (anymore) and the control means 14 thus erroneously has assumed that the drawer 111 has been closed. When the foreign object is removed again, an opening signal A in turn is applied, which however appears at a time t1 deviating from the reference time interval T0 or possibly also completely independent of a control signal P. By checking whether a control signal P has preceded an opening signal A with a predetermined time distance (+/−a tolerance), it can thus be detected whether an opening signal A possibly indicates a manipulation process, which can be evaluated and possibly be registered by means of the control means 14.

The reference time interval T0 with its tolerance range also can be indicated by limits of an admissible range. A time interval T which lies within an admissible range for example can be regarded as proper, whereas a time interval which lies outside the admissible range indicates a manipulation process.

In a real system, the actual time between a control signal P and the beginning of the opening signal A for example can lie in a range between 15 ms and 100 ms, in particular between 25 ms and 75 ms, e.g. around 50 ms. Correspondingly, the reference time interval T0 can be chosen, and a manipulation process for example can be inferred when the time interval T e.g. is smaller than 15 ms, preferably smaller than 10 ms, and greater than 100 ms, preferably greater than 250 ms.

When a manipulation process is detected, a corresponding countermeasure can be started, initiated by the control means 14. The checkout means 10 for example can cooperate with a monitoring means 2 (see FIG. 1), which upon detection of a manipulation process can be actuated by means of the control means 14, in order to possibly record the POS system 1 and its surroundings and in this way capture a manipulation process. The checkout means 10 also can cooperate with an alarm system 3, which can generate an acoustic alarm or alert security personnel inside or outside a retail shop in a silent or loud way.

It is also possible that the control means 14 in cooperation with a POS software of the checkout means 10 associates a detected manipulation process to an operator logged in at the checkout means 10 and in this way logs the manipulation process.

The POS system 1 also can include a self-learning function. In a self-learning way, the control means 14 thus can detect when the time required for opening the cash drawer 1 during a proper opening operation for example changes due to an age-related wear and due to age-related sluggishness. The control means 14 in this case adapts the reference time interval T0 or also an admissible tolerance range B around the reference time interval T0 in a self-learning way, e.g. when it detects that in normal, proper opening operations the time required for opening is increased over a period, so that a false alarm due to wear or age-related sluggishness can be avoided as far as possible.

The idea underlying the invention is not limited to the exemplary embodiments described above, but can also be realized in principle in a completely different way.

The cash drawer for example also can be designed in a completely different way, for example with a flap or the like closing a storage compartment.

The sensor means can in principle also be designed in any way and is not necessarily realized by a microswitch or microcontact.

The drive for opening the cash drawer in principle can be any drive and in particular can be designed electromotively or mechanically by using a mechanical energy accumulator, e.g. a spring or the like.

LIST OF REFERENCE NUMERALS

1 POS system
10 checkout means
100 receiving slot
101 registering means
102 input means
103 display means
11 cash drawer
110 Housing
111 Drawer
112 storage compartment
12 electric data line
120 plug connection
121 Pins
13 sensor means
14 control means
2 monitoring means
3 alarm system
A opening signal
B tolerance range
P control signal
T, T' time interval
T0 reference time interval
t1, t2, t3 point in time
S1, S2 signal

The invention claimed is:

1. A POS system, comprising
   a checkout means for carrying out a payment operation,
   a cash drawer which includes a storage compartment for storing money, wherein in an open condition of the cash drawer the storage compartment is open for an access and in a closed condition of the cash drawer the storage compartment is closed,
   a control means for controlling the cash drawer, wherein the control means is formed to generate a control signal for opening the cash drawer, and
   a sensor means for generating an opening signal which indicates whether the cash drawer is in its open condition,
   wherein the control means is formed to evaluate whether or not an opening signal is preceded by a control signal with a predetermined time interval,
   wherein the control means is formed to determine a time interval between an opening signal generated by the sensor means and a preceding control signal for opening the cash drawer and to compare said time interval with a predetermined reference time interval,
   wherein the control means is further formed to generate an actuation control signal dependent on said comparison and to send the actuation control signal to an alarm system or a monitoring system.

2. The POS system according to claim 1, wherein the control means is formed to measure the time interval between a rising edge of the control signal and a rising edge of the opening signal.

3. The POS system according to claim 1, wherein the control means is formed to indicate a manipulation process when a detected time interval between an opening signal generated by the sensor means and a preceding control signal for opening the cash drawer lies outside an admissible tolerance range.

4. The POS system according to claim 1, wherein the control means is self-learning by being formed to adapt the reference time interval and/or a tolerance range, when it detects a change in a proper opening operation of the cash drawer over a period.

5. The POS system according to claim 1, wherein the control means is formed to indicate a manipulation process, when an opening signal is not preceded directly by a control signal.

6. The POS system according to claim 1, wherein the cash drawer can be removed from the checkout means.

7. The POS system according to claim 1, wherein the cash drawer is connected with the checkout means via an electric data line.

8. The POS system according to claim 7, wherein the control means is formed to send a control signal to the cash drawer and query an opening signal via the electric data line.

9. The POS system according to claim 1, wherein the control means is formed to cooperate with a monitoring means and upon detection of a manipulation process to actuate the monitoring means for initiating a monitoring operation.

10. The POS system according to claim 1, wherein the control means is formed to actuate an alarm system for generating an alarm upon detection of a manipulation process.

11. A method for operating a POS system, which comprises
- a checkout means for carrying out a payment operation, and
- a cash drawer which includes a storage compartment for storing money, wherein in an open condition of the cash drawer the storage compartment is open for an access and in a closed condition of the cash drawer the storage compartment is closed,
- wherein a control means generates a control signal for opening the cash drawer, and a sensor means generates an opening signal which indicates whether the cash drawer is in its open condition, and
- wherein the control means evaluates whether or not an opening signal is preceded by a control signal with a predetermined time interval,
- wherein the control means is formed to determine a time interval between an opening signal generated by the sensor means and a preceding control signal for opening the cash drawer and to compare said time interval with a predetermined reference time interval,
- wherein the control means is further formed to generate an actuation control signal dependent on said comparison and to send the actuation control signal to an alarm system or a monitoring system.

* * * * *